Nov. 19, 1968 R. SOBOTTA 3,411,227

PHOTOGRAPHIC SLIDE PROJECTOR

Filed July 6, 1966

_United States Patent Office_

3,411,227
Patented Nov. 19, 1968

3,411,227
PHOTOGRAPHIC SLIDE PROJECTOR
Reinhard Sobotta, Braunschweig, Germany, assignor to Rollei-Werke Franke & Heidecke, Braunschweig, Germany, a firm of Germany
Filed July 6, 1966, Ser. No. 563,263
Claims priority, application Germany, July 13, 1965, R 41,081
9 Claims. (Cl. 40—79)

ABSTRACT OF THE DISCLOSURE

A slide projector has means for pushing successive slides from one end of a stack of slides, upwardly to a projection gate and then on upwardly to a return chute which delivers the slide to the rear end of the stack of slides. When the upwardly traveling slide reaches a position appropriate to the return chute, a movable pusher member engages the lower part of the slide and pushes it obliquely upwardly in a direction through thickness of the slide, to disengage it positively from the top edge of the next lower slide, so that it will not fail to drop into the return chute.

---

Figure 1:
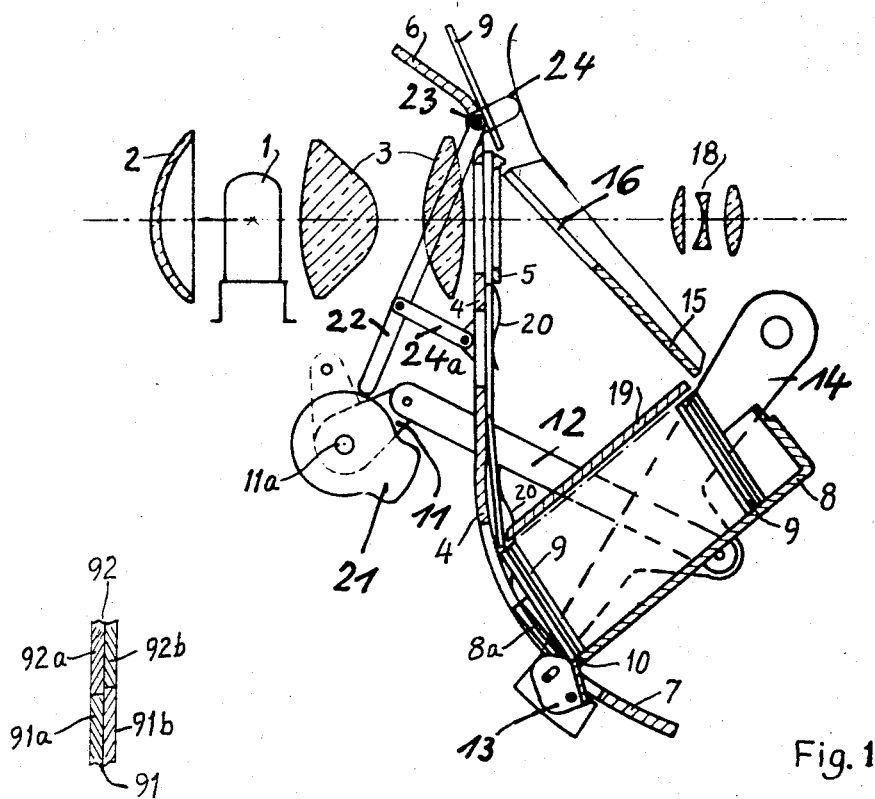

This invention pertains to photographic apparatus, and especially to magazine type slide projectors.

In the U.S. patent application of the present applicant, Reinhard Sobotta, Ser. No. 371,277, filed June 1, 1964, for Photographic Slide Projector (now Patent 3,292,288, granted Dec. 20, 1966), there is described an apparatus for projecting images from photographic slides or transparencies. In this apparatus the slides are removed successively from one end of a stack in a holder or magazine, pushed upwardly one after another through the image aperture guide or projection gate, and after leaving the gate are introduced into a chute on one side of the projection gate, which returns them by gravity to the other end of the stack. The mouth of the chute is longitudinally disposed adjacent one side of the exit end of the projection gate while longitudinally disposed on the other side of the projection gate is an upwardly and a longitudinally outwardly cured bent part or tilt guide. When the uppermost slide is pushed upwardly out of the projection gate, as soon as its bottom edge emerges from the projection gate, the slide being top heavy and longitudinally supported only by the tilt guide pivots or tilts on a horizontal axis so that its bottom edge slides off the top edge of the subjacent slide and is presented to the chute mouth, whereupon the slide slides down into the chute.

This way of returning slides works well when the top and bottom edges of the slides are substantially perfectly square or smooth. However, such is not always the case and herein lies a problem. Most slides comprise a film transparency marginally sandwiched between two cardboard pieces which together form what is called a mount. When the slide is assembled, the two cardboard pieces or layers are not always exactly positioned relative to each other. As a result at the top and bottom ends of the resulting slide mount, one of the layers frequently projects beyond the other, forming a step. In the normal operation of this projector, this step in either the bottom edge of the uppermost slide or the top edge of the subjacent slide tends to obstruct the sliding of the bottom edge from the top edge, and thus interferes with the tilting action. This obstruction becomes more acute when the step in the bottom edge of the uppermost slide is overlapped on the chute side of the slide by a step in the top edge of the subjacent slide.

An object of this invention is to provide a solution to this problem.

More particularly, a specific object of this invention is to provide in this projector means that function to assist the bottom edge of the uppermost slide to slide off the top edge of the subjacent slide.

A general object of this invention is to provide a generally improved and more satisfactory slide projector of the type described.

Figure 2:
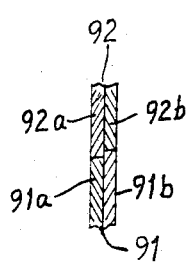

These and other desirable objects may be attained in the manner disclosed as an illustrative embodiment of the invention in the following description and in the accompanying drawing forming a part hereof, in which:

FIG. 1 is a schematic vertical axial section through a preferred specific embodiment of a projector of this invention; and FIG. 2 is an enlarged vertical section through the adjacent bottom and top edge portions of two typical slides, illustrating the stepped construction above mentioned.

The specific slide projector embodiment illustrated in FIG. 1 comprises the usual housing or casing (not shown) containing the usual conventional components of a light source 1, reflector 2, condenser lenses 3, and image aperture guide or projection gate formed between two vertical plates 4 and 5 disposed transversely relative to the optical axis and apertured for passage of light therethrough. The vertical plate 4 has an upper portion 6 which extends upwardly beyond the top end of the vertical plate 5 and curves longitudinally rearwardly, forming a tilt guide surface on which a slide can tilt. The vertical plate 4 has a lower portion 7 which extends below the bottom end of the vertical plate 5 and curves longitudinally forwardly. Suitable guiding or supporting structure of any conventional kind is provided for holding a magazine 8. In the embodiment illustrated, the magazine is a simple box or trough having a cover 19 that terminates short of the front and back ends of the box. The box is open at its front end, except for inwardly extending transverse flanges 8a at the forward end. Under normal conditions the magazine 8 contains a stack of slides 9. The forward part of the bottom wall of the magazine 8 has a notch 10. The magazine 8 is longitudinally positioned in the projector at an inclination with the front end of the magazine facing toward the rear of the projector and being downwardly from the back end of the magazine, whereby the stack of slides constantly tends to feed itself by gravity to the front end of the magazine. The first or end slide is prevented from falling out the open end of the magazine by the lateral flanges 8a.

An operating crank 11, comprising a driving crank shaft 11a, is connected by a link 12 to a lifter lever 14 pivotally mounted in the casing and having pivotally secured to its free end a member 13 which may be called a lifter or pusher or claw or gripper member. When the crank 11 is turned in its normal direction of rotation, which is counterclockwise in FIG. 1, it pulls on the link 12, moving the lever 14 in a direction, which in FIG. 1 is clockwise, to raise the lifter 13 through the notch 10 in the magazine 8 to engage the first one of the slides 9 at the front end of the magazine and to raise the slide upwardly along the curved portion 7 of the vertical plate 4. Leaf springs 20 are provided for engaging the marginal edges of the slides as they are pushed upwardly along the vertical plate 4, and for holding them against the front face of the plate 4. The lifter 13 has a range of travel exactly equal to the vertical dimension of one slide so that each time the lifter mechanism 11, 12, 13, and 14 is operated through a cycle, it moves a slide up through exactly the vertical dimension of the slide, and the slide in projection position in the projector gate is properly alined with the optical axis. In the region of the top edge of the plate 5 is the entrance or upper end of a vertically inclined longitudinal chute 15, the lower and of which is between the back end of the magazine 8 and the back end of the cover 19. The chute 15 has an aperture 16 in line with the optical axis so that light rays can pass therethrough to the projection lens system 18 for projection onto a suitable screen or image reflecting surface.

The improvement which this invention contributes to this projector structure comprises a cam disk or radial cam 21 secured to the driving crank shaft 11a. In addition, the improvement comprises a cam follower rod 22 normally approximately vertically disposed with the bottom end thereof riding on the radial cam 21.

The upper end of the cam follower rod 22 is pivotally secured to a roller 23 which has a horizontal axis of rotation. The roller 23 is disposed through a suitable opening in the bottom part of the backwardly curved tilt guide 6. Preferably, the roller 23 horizontally extends the full horizontal dimension of a slide 9. Also, the circumferential periphery of the roller 23 preferably has a coating of material with a high coefficient of friction relative to the slide 9. Slots 24 are preferably provided in the casing or in marginal flanges on each side of the tilt guide 6 and the ends of the rollers 23 are disposed in these slots so as to guide the roller 23 in its travel. The slots are preferably directed obliquely upward, that is, inclined longitudinally upwardly in the direction of the front of the projector. The cam follower rod 22 is supported by a link 24a pivotally secured thereto and to the vertical plate 4.

The radial cam 21 has a raised or crown portion which is positioned so that in a cycle of operation, as soon as the bottom end of the uppermost slide has emerged from the projection gate, the cam follower rod 22 is elevated or raised by the crown portion of the radial cam 21, and is raised sufficiently to move the roller 23 forwardly. Consequently, the bottom end portion of the uppermost slide is positively thrust frontwardly with sufficient force to overcome most surface irregularities of the adjacent edges.

Such irregularities of the edges of the slides or mounts may take the form shown schematically on an enlarged or exaggerated scale in FIG. 2. Here, there are shown a fragment of the upper portion of a lower mount 91 and the lower portion of an upper mount 92. The mounts are of the usual cardboard construction, comprising two cardboard layers 91a and 91b in the case of the lower mount 91, and 92a and 92b in the case of the upper mount 92.

Although the edges of the two cardboard layers are supposed to be flush with each other, it sometimes happens, due to manufacturing errors or careless assembly, that one layer will project slightly beyond the other, as shown in FIG. 2, where the layer 91b projects slightly beyond the layer 91a, and the layer 92a projects slightly beyond the layer 92b. These same irregularities or steps can occur in plastic slide mounts as well as the more familiar cardboard slide mounts. If gravity alone is relied upon to tilt the upper slide 92 to disengage it from the lower slide 91 on which it is resting, the slightly projecting step 92a at the bottom edge of the upper slide may catch behind the slightly projecting step 91b at the top edge of the lower slide, so that the upper slide remains "hung up" on the lower slide and will not release itself therefrom to fall down the return chute 15.

Because of the roller movement being in an inclined upward direction, the tendency of the roller 23 is to lift the uppermost slide and thus its bottom edge from the top edge of the subjacent slide at the same time that the bottom end portion of the uppermost slide is pushed frontwardly. This action disengages the bottom edge of the uppermost slide from the top edge of the subjacent slide even when overlapping such as described has occurred.

Thus, there is provided a mechanism for assuring introduction of the uppermost slide in this type of slide projector into the return chute.

A feature of advantage of this construction is its inherent simplicity and inherent ruggedness.

Other features, advantages and specific embodiments of this invention will be readily apparent to those in the exercise of ordinary skill in the art after reading the foregoing disclosure.

It is seen from the foregoing disclosure that the objects and purposes of the invention are well fulfilled. It is to be understood that the disclosure is given by way of illustrative example only, rather than by way of limitation, and that without departing from the invention, the details may be varied within the scope of the appended claims.

What is claimed is:

1. A magazine type photographic slide projector comprising:
   (A) a projection gate having a normally horizontally disposed optical axis, a bottom slide entrance and a top slide exit;
   (B) lifter means for impelling the bottom slide of a downwardly inclined stack of slides in a magazine upwardly in a vertically disposed path to said entrance and for shoving thereby a line of slides in end to end abutment in said path to said entrance, through said projection gate and out of said exit;
   (C) means forming said path;
   (D) chute means comprising a chute having an entrance above said projection gate for receiving the top slide pushed out of said projection gate and tilted for introduction into said chute means, and for delivering said top slide to the normally upper end of said stack of slides in said magazine;
   (E) tilt guide means on which said top slide is supported upon being pushed by a subjacent slide out of said projection gate exit and on which said top slide pivots into a tilted position for introduction into said chute means, after the lower edge of said top slide has been pushed upwardly beyond said top exit of said projection gate; and
   (F) pusher means for thrusting said top slide toward said tilted position at least after its bottom edge has emerged from said exit.

2. Apparatus according to claim 1, wherein said pusher means engages a bottom portion of said top slide.

3. Apparatus according to claim 2, wherein said pusher means also thrusts said portion upwardly so as to lift the bottom edge of said top slide from the top edge of the subjacent slide.

4. Apparatus according to claim 3, wherein said lifter means for impelling the bottom slide from said stack comprise a rotatable drive shaft on a normally horizontally disposed axis of rotation, and said pusher means comprise normally horizontally and transversely disposed roller means for engaging said portion of said top slide and supported for normally inclined movement longitudinally, toward said tilt position, radial cam means below said roller means, secured to said drive shaft and having a crown portion, and cam follower means pivotally secured to said roller means, vertically disposed and riding on said radial cam means, said crown portion being arranged to impel said cam follower means upwardly and thus said roller means upwardly and longitudinally outwardly when said lifter means impells a bottom slide upwardly substantially the distance from the top edge to the bottom edge of said top slide.

5. An apparatus according to claim 4, wherein said roller means presents to said portion of said top slide a surface having a high coefficient of friction.

6. An apparatus according to claim 5, wherein said roller means comprises a roller extending over the full width of said slide.

7. A photographic slide changer comprising means for projecting a beam of light approximately horizontally along an optical axis and means for pushing a series of successive slides upwardly to a projection position intersecting said optical axis and thence on upwardly to a position above said optical axis, with the top edge of each slide supporting and pushing upwardly on the bottom edge of the next higher slide; and movable means for pushing the lower portion of the topmost slide in a direction through the thickness of such slide, to disengage the bottom edge of the topmost slide positively from the top edge of the next lower slide so that the topmost slide is no longer supported by the next lower slide.

8. A construction as defined in claim 7, further characterized by the fact that said means for pushing the lower portion of the topmost slide pushes against it in an obliquely upward direction, to tend to lift the topmost slide as well as displace it in a direction through the thickness of the slide.

9. A construction as defined in claim 7, further characterized by the fact that said means for pushing the lower portion of the topmost slide includes a movable pusher member having a relatively high friction portion for engaging the topmost slide.

References Cited

UNITED STATES PATENTS 2,653,512  9/1953  Brock _____ 40—79 XR

EUGENE R. CAPOZIO, *Primary Examiner.*

WILLIAM H. GRIEB, *Assistant Examiner.*